(12) United States Patent
Delanghe et al.

(10) Patent No.: US 11,338,718 B2
(45) Date of Patent: May 24, 2022

(54) RAMP DEVICE FOR LOADING AND UNLOADING VEHICLES

(71) Applicant: Caliber, Inc., Burnsville, MN (US)

(72) Inventors: Ernest J. Delanghe, Burnsville, MN (US); Steven W. Potter, Prior Lake, MN (US); Randall Seurer, Lonsdale, MN (US); Joseph Edward Hanneman, Lakeville, MN (US); Paul Dathe, Plymouth, MN (US)

(73) Assignee: Caliber, Inc., Burnsville, MN (US)

( * ) Notice: Subject to any disclaimer, the term of this patent is extended or adjusted under 35 U.S.C. 154(b) by 0 days.

(21) Appl. No.: 16/823,723

(22) Filed: Mar. 19, 2020

(65) Prior Publication Data

US 2020/0215954 A1 Jul. 9, 2020

Related U.S. Application Data

(62) Division of application No. 15/450,753, filed on Mar. 6, 2017, now abandoned.
(Continued)

(51) Int. Cl.
*B65G 69/28* (2006.01)
*B60P 1/43* (2006.01)

(52) U.S. Cl.
CPC .............. *B60P 1/43* (2013.01); *B65G 69/28* (2013.01)

(58) Field of Classification Search
CPC ........... B60P 1/43; B65G 69/28; B65G 69/30; B25G 3/14
See application file for complete search history.

(56) References Cited

U.S. PATENT DOCUMENTS 726,288 A * 4/1903 Hendrick ................. B25G 3/04
279/102
1,359,835 A 11/1920 Pease
(Continued)

FOREIGN PATENT DOCUMENTS

CA 2172555 A1 * 9/1997 ............... B60P 1/43
CA 2634836 C 1/2009

OTHER PUBLICATIONS

Prosecution history from corresponding U.S. Appl. No. 15/450,753, filed Mar. 6, 2017 including: Advisory Action dated Feb. 28, 2020, Final Rejection dated Dec. 19, 2019, Non-Final Rejection dated May 24, 2019, and Requirement for Restriction/Election dated Sep. 6, 2018.
(Continued)

*Primary Examiner* — Thomas B Will
*Assistant Examiner* — Katherine J Chu
(74) *Attorney, Agent, or Firm* — Peter J. Ims; Westman, Champlin & Koehler, P.A.

(57) ABSTRACT

A ramp is configured to allow a vehicular machine to move from a ground surface to an elevated surface of a transport vehicle. The ramp has a length along a longitudinal direction and includes a first portion, a first web, and a second portion. The first portion includes a first rail and a second rail, each of the first and second rails being oriented substantially parallel to the longitudinal direction. The first web is positioned on the first portion and includes a first array of raised members arranged so that a first plurality of longitudinal travel paths are defined on the first web between at least some of the raised members of the first array. The second portion is connected to the second rail at a first hinge. The second portion includes a third rail and a fourth rail.

6 Claims, 12 Drawing Sheets

Related U.S. Application Data (60) Provisional application No. 62/303,835, filed on Mar. 4, 2016.

(56) References Cited

U.S. PATENT DOCUMENTS

| | | | |
|---|---|---|---|
| 2,461,678 A | 2/1949 | Christensen | |
| 2,900,094 A * | 8/1959 | Ferguson | B60P 1/43 414/537 |
| 3,517,791 A | 6/1970 | Miles | |
| 3,548,433 A | 12/1970 | Miles et al. | |
| 3,984,891 A | 10/1976 | Weinmann | |
| 4,528,711 A * | 7/1985 | Packer | B65G 69/30 14/69.5 |
| 5,212,847 A * | 5/1993 | Melcher | A45D 40/28 15/209.1 |
| 5,325,558 A | 7/1994 | Labreche | |
| 5,331,701 A * | 7/1994 | Chase | A61G 3/061 14/71.1 |
| 5,538,308 A | 7/1996 | Floe | |
| 5,553,989 A | 9/1996 | Ullman | |
| 5,853,281 A * | 12/1998 | Farmer | B65G 69/30 414/537 |
| 6,099,233 A * | 8/2000 | Craik | B60P 1/43 14/71.1 |
| 6,269,508 B1 | 8/2001 | Younce | |
| 6,328,361 B1 * | 12/2001 | Spear | A01B 1/20 294/57 |
| 6,408,586 B1 | 6/2002 | Deckert | |
| 6,430,769 B1 | 8/2002 | Allen | |
| 6,460,769 B1 | 10/2002 | Knowles et al. | |
| 6,543,985 B1 | 4/2003 | Harstad et al. | |
| 6,592,135 B2 | 7/2003 | Hendrix | |
| 6,827,543 B2 | 12/2004 | O'Neil | |
| 6,837,669 B2 | 1/2005 | Reed et al. | |
| 7,013,518 B2 * | 3/2006 | Leblanc | B60P 1/43 14/69.5 |
| 7,043,789 B2 | 5/2006 | Morrish | |
| 7,179,042 B1 | 2/2007 | Hartmann et al. | |
| D595,919 S | 7/2009 | Lederhause et al. | |
| 7,637,518 B2 * | 12/2009 | Adair | B65G 69/30 280/163 |
| 7,810,196 B1 | 10/2010 | Pritchard et al. | |
| 8,256,053 B2 | 9/2012 | Astor et al. | |
| 8,764,088 B1 | 7/2014 | Jobe | |
| 8,821,102 B1 * | 9/2014 | Boguslawski | B60P 1/43 414/537 |
| 8,821,192 B2 | 9/2014 | Chang et al. | |
| 9,221,631 B2 | 12/2015 | Breeden, III et al. | |
| 9,617,693 B1 | 4/2017 | Penland, Jr. | |
| 2003/0140433 A1 * | 7/2003 | Rieber | A63C 19/10 14/69.5 |
| 2003/0145398 A1 * | 8/2003 | Schomaker | B60P 1/43 14/69.5 |
| 2003/0213072 A1 * | 11/2003 | Myrick | A01K 1/035 14/69.5 |
| 2004/0045487 A1 * | 3/2004 | Verkley | A47B 1/04 108/77 |
| 2007/0199166 A1 | 8/2007 | Peschmann | |
| 2008/0034512 A1 | 2/2008 | Meyers | |
| 2009/0051179 A1 * | 2/2009 | Wang | A47G 21/103 294/218 |
| 2010/0050840 A1 * | 3/2010 | Jesberger | B23Q 3/105 83/156 |
| 2010/0223740 A1 | 9/2010 | Pratt et al. | |
| 2014/0271100 A1 | 9/2014 | Giemza | |
| 2014/0338137 A1 * | 11/2014 | Stokes | B60D 1/52 14/71.1 |
| 2015/0367682 A1 * | 12/2015 | Delanghe | B60B 39/12 238/14 |
| 2016/0144759 A1 * | 5/2016 | DiBlasio | B62D 33/023 414/537 |
| 2017/0253164 A1 | 9/2017 | Delanghe et al. | |
| 2020/0346425 A1 * | 11/2020 | Klopp | B30B 11/08 |

OTHER PUBLICATIONS

Canadian Office Action dated Mar. 5, 2018 for corresponding Canadian Application No. 2,959,921, filed Mar. 6, 2017.
Canadian Office Action dated Dec. 10, 2018 for corresponding Canadian Application No. 2,959,921, filed Mar. 6, 2017.
Canadian Office Action from corresponding Canadian patent application No. 2,959,921 dated Jun. 29, 2021.

* cited by examiner

RAMP DEVICE FOR LOADING AND UNLOADING VEHICLES

CROSS REFERENCE TO RELATED APPLICATION

The present application is a divisional application of U.S. patent application Ser. No. 15/450,753 entitled "Ramp Device for Loading and Unloading Vehicles, which was filed on Mar. 6, 2019 which claims the benefit of U.S. Provisional Patent Application No. 62/303,835, filed Mar. 4, 2016, for "Ramp Device for Loading and Unloading Vehicles," the contents of both application are fully incorporated herein by reference.

BACKGROUND

The present disclosure relates to a ramp device that is configured to be used for loading and unloading of vehicular machines such as snowmobiles, all-terrain vehicles (ATV's), utility vehicles (UTV's), motorcycles, snow bikes, golf carts, and utility machines such as riding lawn mowers, from a bed of a truck or a trailer. More particularly, the present disclosure relates to a ramp that is configured to be removably attached to a tailgate or bed while also being configured to be manipulated into a compact configuration for transport and storage.

Currently, there are many ramps on the market that are designed specifically for a certain type of vehicular machine. The designs of these ramps attempt to facilitate loading with correct traction and glide, while transporting a machine to a different vertical level. Unfortunately, many ramps do not effectively provide adequate machine tire traction, track traction, foot traction, or smooth glide where needed.

While not ideal, consumers may use an ATV ramp for loading a snowmobile, and consumers may use a snowmobile ramp for loading an ATV, for example, and vice versa. Consumers struggle with cost-effective ways to load their machines and in some cases may compromise their safety in doing so.

In some instances, users are not using a strap to secure the ramp to the tailgate or bed, which can result in the ramps being ejected off the transport vehicle and injury to the user. Further, in many instances, adequate surfaces for walking on the ramps are not available, especially in power sports ramps. The lack of adequate walking surfaces can result in users falling when loading and unloading the machines.

SUMMARY

In one aspect, a ramp is configured for use with a vehicular machine to allow the vehicular machine to move from a ground surface to an elevated surface of a transport vehicle. The ramp has a length along a longitudinal direction and comprises a first portion, a first web, and a second portion. The first portion comprises a first rail and a second rail, each of the first and second rails being oriented substantially parallel to the longitudinal direction. The first web is positioned on the first portion and comprises a first array of raised members arranged so that a first plurality of longitudinal travel paths are defined on the first web between at least some of the raised members of the first array. The second portion is connected to the second rail at a first hinge. The second portion comprises a third rail and a fourth rail, each of the third and fourth rails being oriented substantially parallel to the longitudinal direction.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure. Analogous parts are indexed in increments of one hundred. It is to be understood that all descriptions relevant to a part also apply to all analogous parts.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 1:
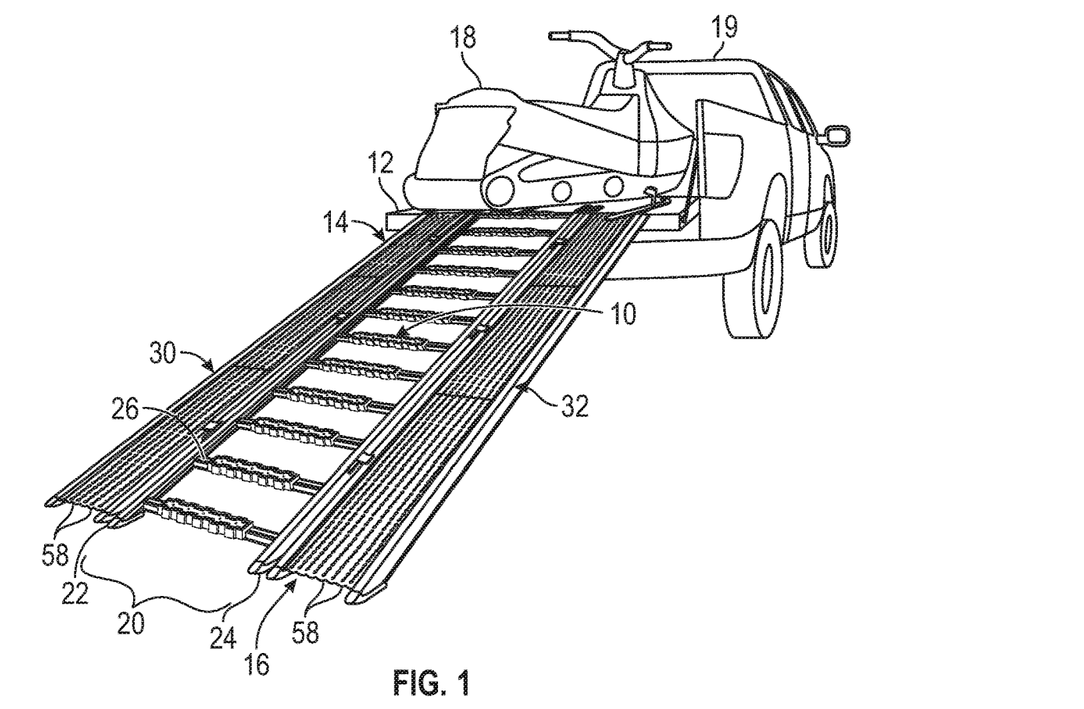
FIG. 1 is a perspective view of an exemplary ramp secured to an end gate of a pickup truck.

As shown in FIG. 1, ramp 10 is configured to be used for loading and unloading of a vehicular machine 18 such as a snowmobile, ATV, UTV, motorcycle, snow bike, golf cart, riding lawn mower, or other utility or recreational machine, from a bed of a truck or a trailer (e.g., transport vehicle 19). Ramp 10 allows the vehicular machine 18 to move from a ground surface at end 16 to an elevated surface of a transport vehicle 19 at end 14. An end 14 of ramp 10 is configured for removable attachment to a tail gate 12, bed, or other portion of transport vehicle 19. An opposite end 16 of ramp 10 is configured to engage a ground surface. The ramp 10 is configured to withstand the forces imparted through the raising and lowering of vehicular machine 18 onto and off from the transport vehicle 19.

Figure 2:
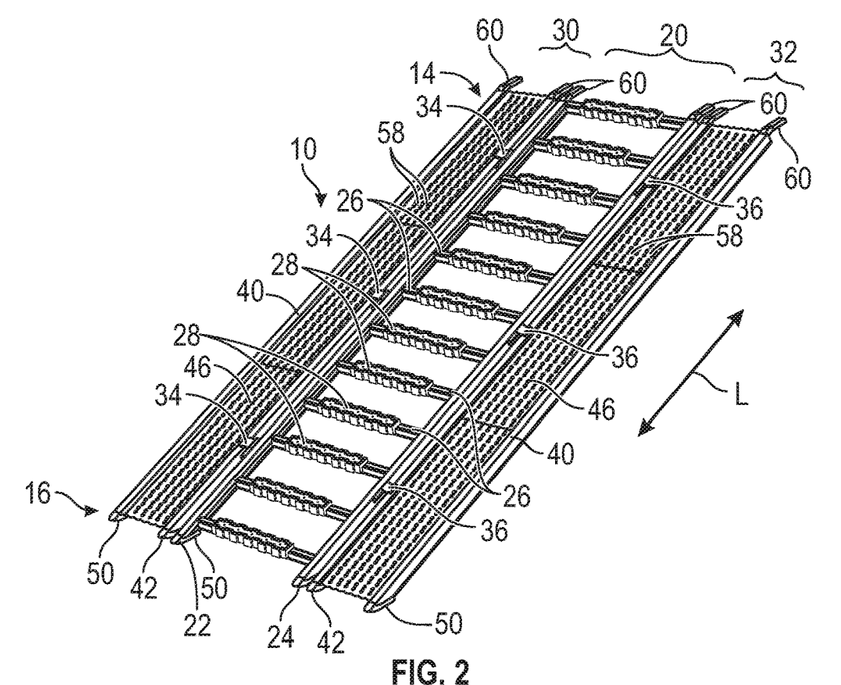
FIG. 2 is a perspective view of the ramp.

Referring to FIGS. 1 and 2, the ramp 10 includes a middle portion 20 having left and right spaced apart side rails 22 and 24 that are connected together with a plurality of spaced apart cross bars 26. The cross bars 26 are connected at substantially uniform intervals along a length of the spaced apart side rails 22 and 24. Side rails 22 and 24 are oriented substantially parallel to the length along the longitudinal direction L of ramp 10.

The spaced apart side rails 22 and 24 and the plurality of cross bars 26 are typically constructed of a tubular aluminum. Aluminum provides sufficient structural integrity to withstand the forces imparted on the ramp 10 while loading and unloading devices from the ground surface to the bed and back, while being light in weight, which aids in moving and positioning the ramp 10 in selected locations. While aluminum is a typical material of construction, other materials can also be utilized including other metals and/or thermoplastics.

The cross bars 26 have a sufficient width to engage a track of the snowmobile 18. Cross bars 26 are formed from one-inch aluminum tubing in an exemplary embodiment. To prevent slippage of, and potential damage to, vehicular machine 18, in an exemplary embodiment, the cross bars 26 are at least partially covered with a grip cover or traction enhancing cover 28. The traction enhancing cover 28 typically includes a rough surface that is configured to engage the track of snowmobile 18 without slippage, where the traction enhancing cover 28 is typically a molded polymeric material. Each traction enhancing cover 28 is typically secured to an individual cross bar 28 with a fastener as such a screw or bolt. Advantageously, in such cases, the traction enhancing cover 28 can be replaced by removing the fastener, installing a new cover 28, and the reinstalling the fastener. Other securing mechanisms are also within the scope of the present disclosure, including but not limited to, a rivet, a snap fit device, and an adhesive. In an exemplary use, traction enhancing cover 28 protects studs of a snowmobile from damage, as well as protects cross bars 26 from damage from such studs.

Figure 3:
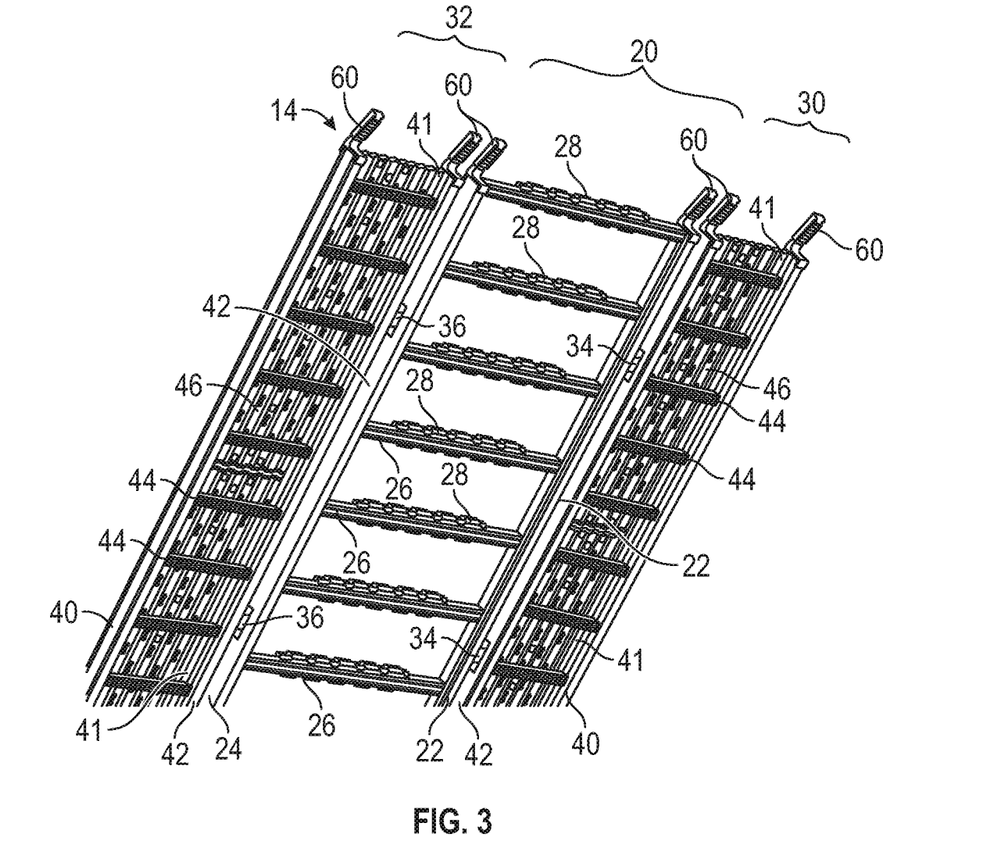
FIG. 3 is a partial perspective view of the ramp from beneath the ramp.
Figure 4:
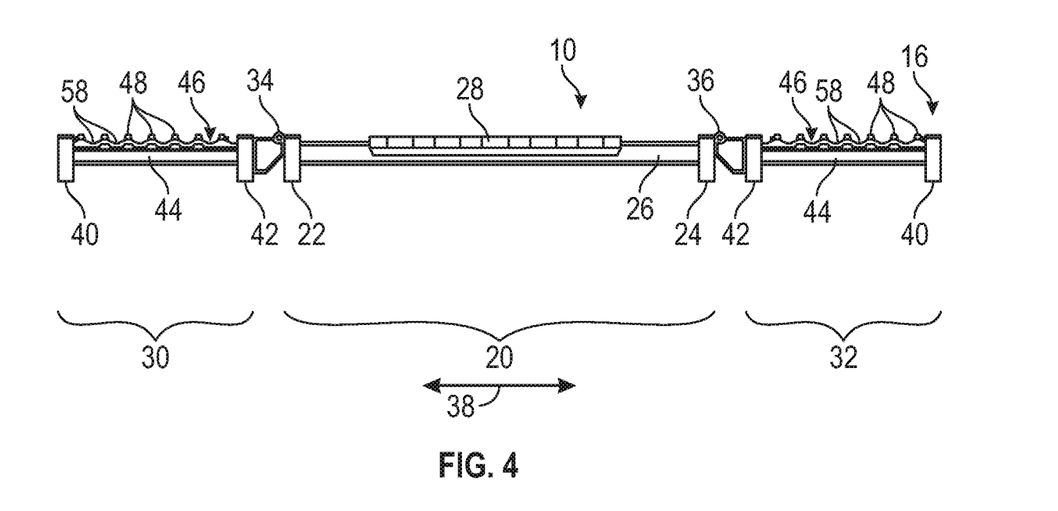
FIG. 4 is a front view of the ramp in an open, loading and unloading configuration.
Figure 5:
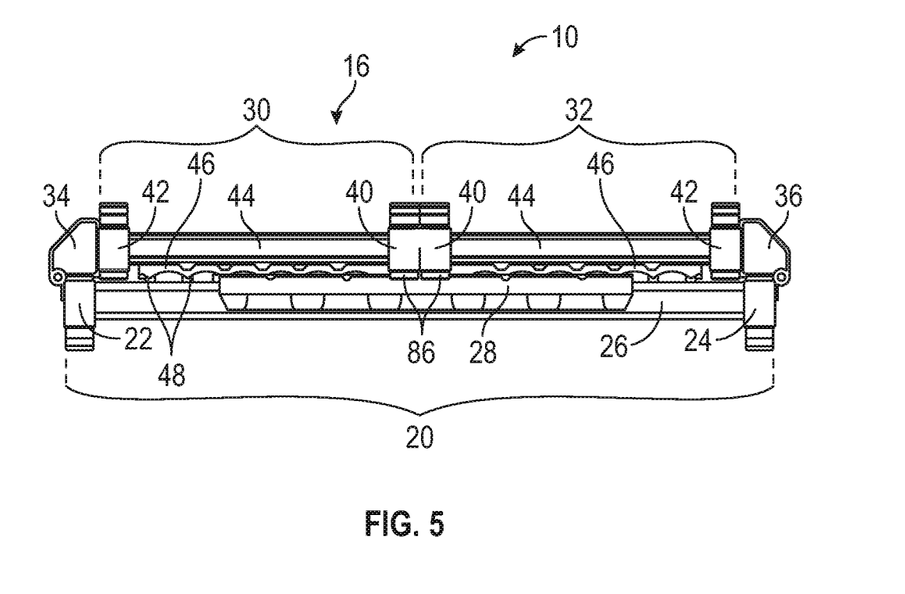
FIG. 5 is a front view of the ramp in a folded configuration.

Referring to FIGS. 2-5, the ramp 10 includes left and right track portions 30 and 32 that are configured to engage tires, wheels or skis of ATV's, UTV's, motorcycles, snow bikes, golf carts, snow mobiles, and utility machines, such as riding lawn mowers. The left track portion 30 is hingedly connected to the a left side of the middle portion 20 with a plurality of spaced apart hinges 34 that are configured to allow the left track portion 30 to be retained in a loading position substantially even with the middle portion 20 (as illustrated in FIGS. 1-4) and move to a stored position (as illustrated in FIG. 5).

Similarly, the right track portion 32 is hingedly connected to a right edge of the middle portion 20 with a plurality of hinges 36, wherein the hinges 34 and 36 are similarly constructed. The hinges 36 are configured to allow the right track portion 32 to be retained in a loading position substantially even with the middle portion 20 (as illustrated in FIGS. 1-4) and a stored position (as illustrated in FIG. 5). The hinges 34 and 36 transfer a load from the portions left and right track portions 30 and 32 to the middle portion 20 and vice versa to spread the load across the ramp 10, which reduces the amount of material required in the rails 22, 24, which in turn reduces weight and cost of the ramp 10. In the open position of FIGS. 2 and 4, top surfaces of left portion 30, middle portion 20 and right portion 32 all lie in substantially a common plane (e.g., a top surface of the open ramp 10 is substantially flat). In the closed position of FIG. 5, left and right portions 30 and 32 are pivoted upward about respective hinges 34, 36 so that the top surfaces of left and right portions 30 and 32 now face downward and toward the top surface of middle portion 20.

The left track portion 30 and the right track portion 32 are similarly constructed and are typically substantially mirror images of each other. Each track portion 30 and 32 includes space apart rails 40 and 42 that have a similar construction to that of rails 22 and 24. Side rails 40 and 42 are oriented substantially parallel to the longitudinal direction L of ramp 10. The rails 40 and 42 are connected together with a plurality of spaced apart cross members 44, as shown in FIG. 3. The cross members 44 are typically made of a corrosion-resistant metal material, such as, but not limited to aluminum. The metal material provides sufficient strength to support and guide wheels, tires or skis of vehicular machines 18 to be used with ramp 10.

The area between the spaced apart rails 40 and 42 is substantially covered with a web 46 that has an array of raised members 48, such as lugs, arranged in rows, such as shown in FIG. 4. The web 46 is supported along longitudinal edges of rails 40, 42 by longitudinal ribs 41. The rows of raised members 48 are spaced apart to define a plurality of longitudinal travel paths or channels 58 therebetween. Such travel paths or channels 58 allow carbide(s) of a snowmobile ski to be positioned between adjacent rows of raised members 48 and thereby travel by gliding over a smooth surface. At the same time, the rows of raised members 48 substantially prevent movement in a lateral direction 38 (labeled in FIG. 4; substantially perpendicular to the longitudinal direction L of ramp 10). The rows include spaced apart raised members 48 that provide traction to a wheel as the vehicular machine 18—or traction to a user's shoes as the user— travels up and down on the track portions 30 and 32. Such traction is especially useful in conditions including rain and snow. Further, because the raised members 48 have a relatively low profile, a person can easily walk on the web 46 without a likelihood of tripping or slipping.

The web 46 is typically a polymeric material to provide traction, guidance and wear properties while being light in weight. However, the web 46 can be constructed from other materials and also can have other upper surface configurations than disclosed herein. In some embodiments, the web 46 includes slots (not shown) through which fastening mechanisms are secured to ribs 41. Moreover, other slots or apertures may be provided in web 46 to allow precipitation flow and expansion and contraction due to temperature changes, to prevent warpage.

Figure 6:
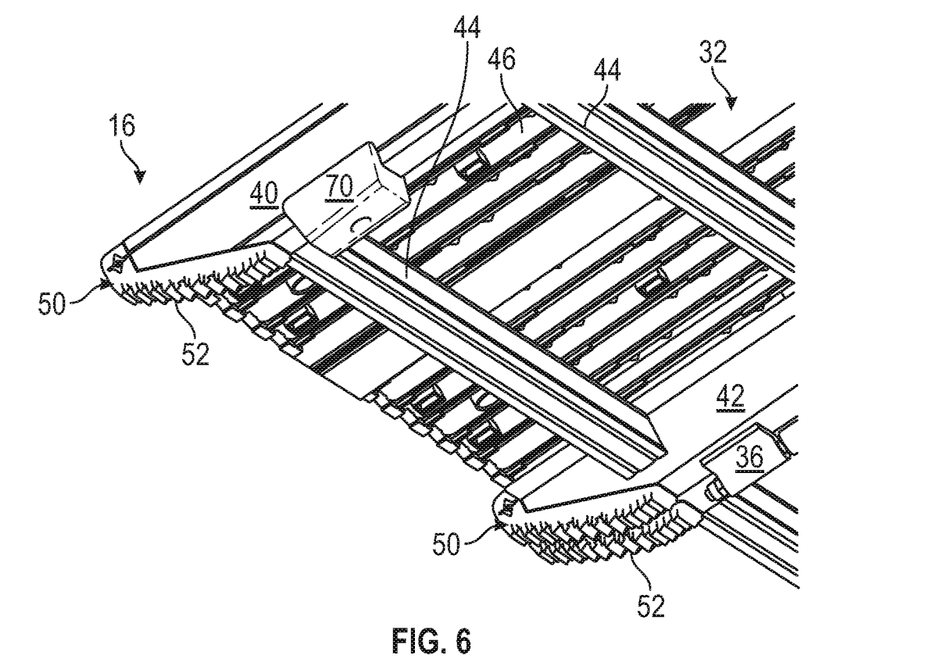
FIG. 6 is a partial, underside perspective view of the ramp with the feet.

When in the folded configuration of FIG. 5, a width of the ramp 10 is sufficiently narrow to allow the ramp 10 to be stored on a bed of transport vehicle 19 beneath a vehicular machine 18 and between its wheels, tires, or skis. Referring to FIG. 6, the ramp 10 can optionally include one or more slide bars 70 that are located on one or more of rails 22, 24, 40, 42. The slide bars 70 aid in moving the ramp 10 on a tail gate or bed of transport vehicle 19 by reducing friction, and therefore preventing damage to the bed or tail gate as the ramp 10 is slid thereon. The slide bars 70 can be located on any or all of the rails 22, 24, 40 and 42 on an outside surface thereof. Slide bars may be formed of a low-friction polymer. When worn, slide bars 70 may be removed and replaced.

Figure 7:
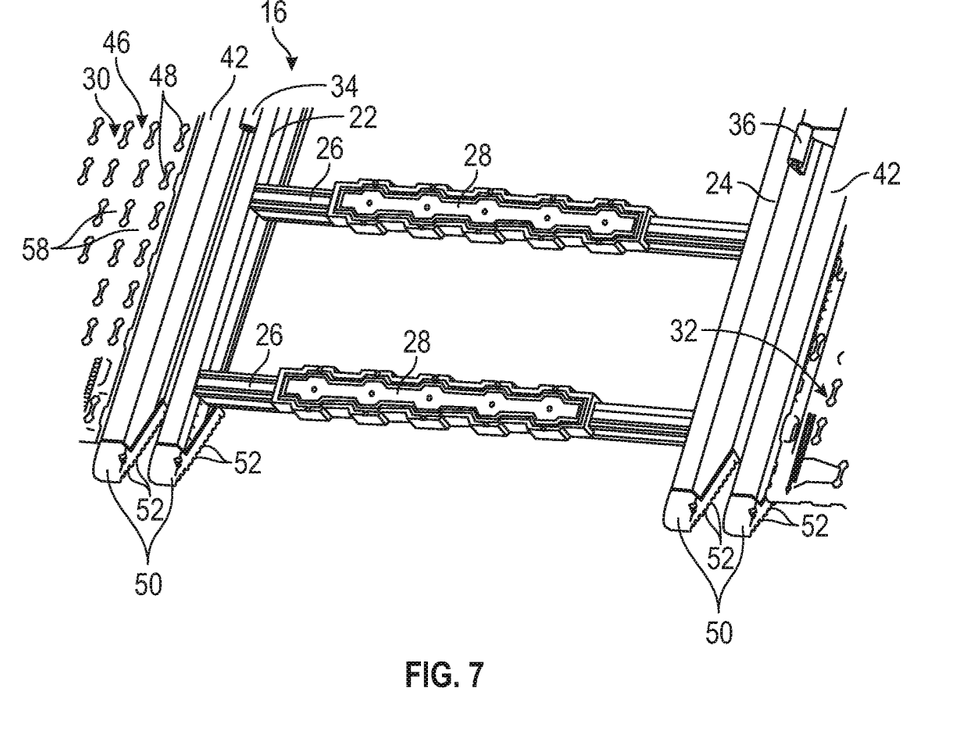
FIG. 7 is a partial, top perspective view of the ramp with the feet.

Referring to FIGS. 6 and 7, the ramp 10 includes flexible feet 50 extending from the ends 16 of the rails 22, 24, 40 and 42. In an exemplary embodiment, the flexible feet 50 are fixedly secured to the rails 22, 24, 40 and 42 and are typically formed from a flexible polymer rubber foot to conform to the terrain or ground surface. Feet 50 provide traction on the ground or loading base of the ramp 10. In an exemplary embodiment, each foot 50 includes barbs or teeth 52 that are oriented in a direction substantially traverse to a direction of travel of vehicular machine 18 on the ramp 10 (e.g., a longitudinal direction L of ramp 10). The barbs or teeth 52 allow the feet to equalize pressure across the ground surface or loading base despite different ground conditions, such as but not limited to, snow, grass, dirt and concrete.

Figure 8:
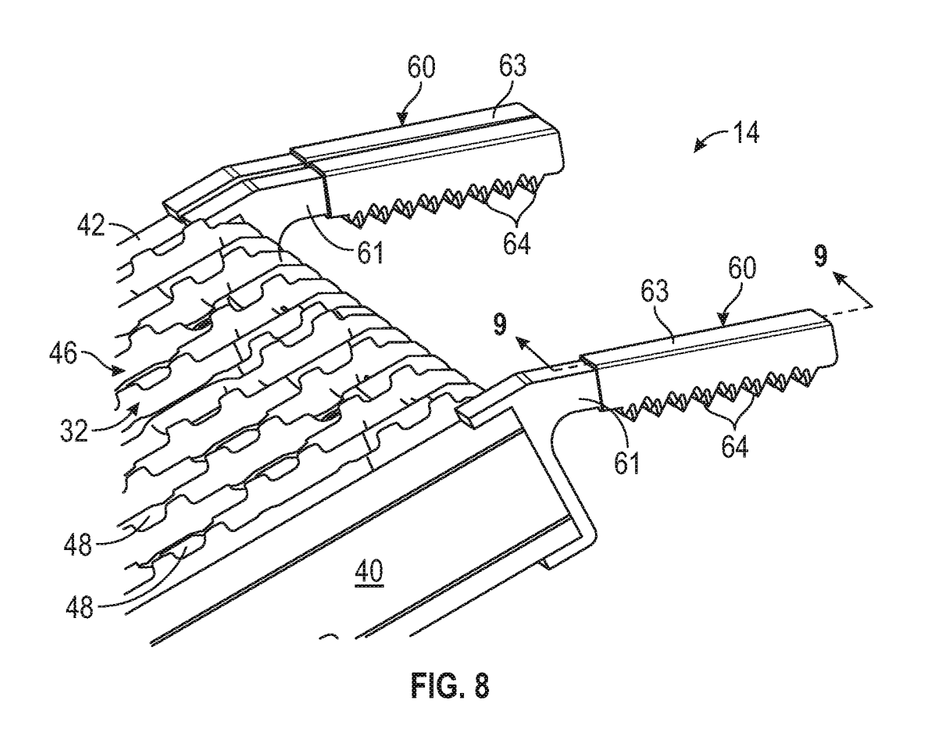
FIG. 8 is a partial perspective view of a top portion of the ramp with an engaging member.
Figure 9:
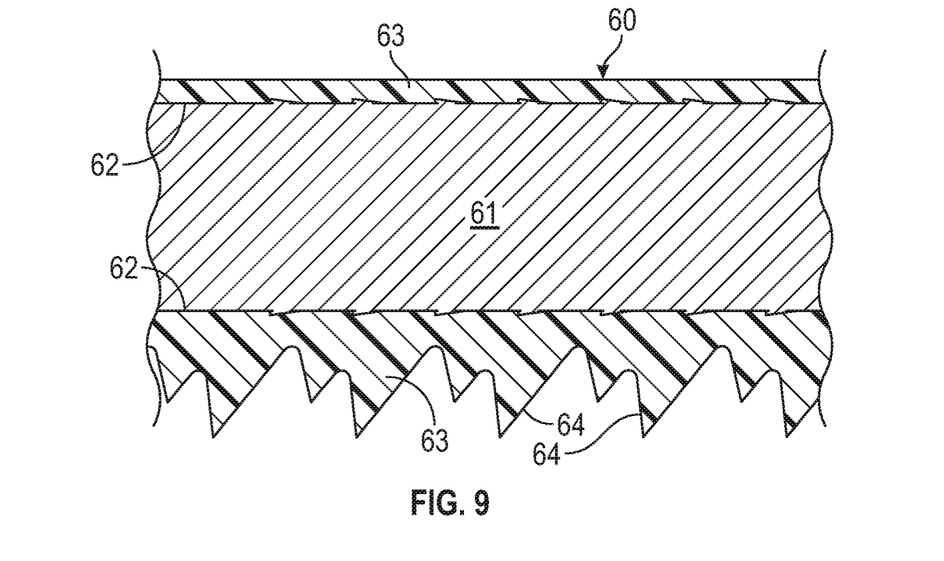
FIG. 9 is a partial cross-sectional view of the engaging member, taken along line 9-9 of FIG. 8.

Referring to FIGS. 8 and 9, end 14 of ramp 10 includes bed or tailgate engaging mechanisms 60 fixedly secured to ends of the rails 22, 24, 40 and 42, where the engaging mechanisms 60 are configured to be removably secured to the bed or tailgate by the weight of the ramp 10 and the vehicular machine 18 being moved on the ramp 10. The engaging mechanisms 60 include an inner portion or finger 61 that optionally includes barbed or uneven surfaces 62. An overlay 63 is formed of an elastomeric material and can have an uneven interior surface configured to mechanically interlock with the uneven exterior surface 62 of the finger 61. Overlay 63 is positioned on the inner portion or finger 61, wherein the mechanical interlocking of the interfacing surfaces retains the overlay 63 thereon and prevents the overlay 63 from slipping off of the finger 61.

The finger 61 is typically constructed of a metal, such as aluminum. However, other materials of construction are also contemplated. The overlay 63 is typically constructed of a flexible polymer and includes a plurality of teeth 64 that are configured to engage the bed or tail gate to prevent slippage as a vehicle is moved over the ramp 10. The plurality of teeth 64 are orientated substantially traverse to a direction of travel of the vehicle on the ramp 10 (e.g., longitudinal direction L of ramp 10) to aid in the prevention of slippage of end 14 from the bed or tailgate of transport vehicle 19.

Figure 10:
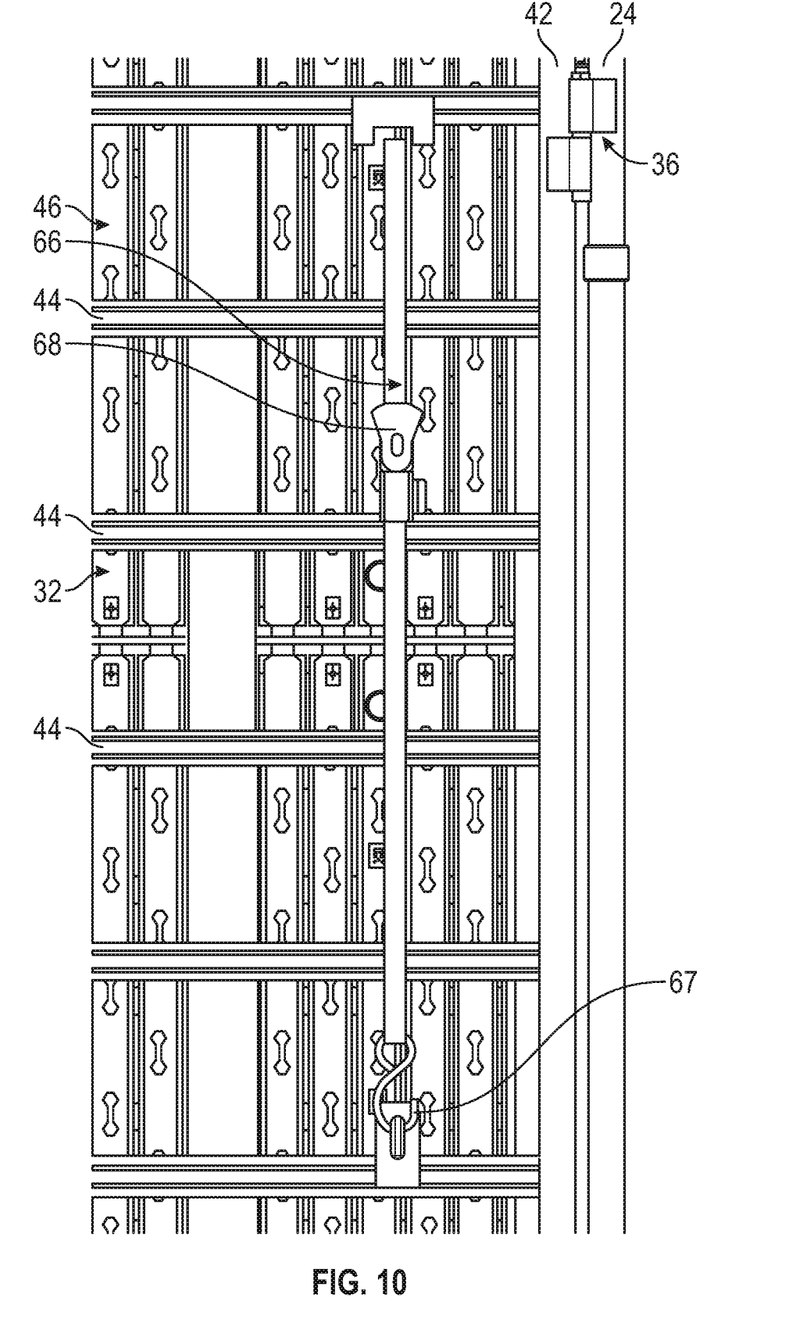
FIG. 10 is a partial underside view of the ramp with an attached strap.

Referring to FIG. 10, the ramp 10 includes a strap 66 that is utilized to attach the ramp 10 to the bed or tailgate of transport vehicle 19. The strap 66 may be fixedly attached to the ramp at an easy-to-locate homing location, such as a plate or bracket, such as at one end of strap 66, while the other end of strap 66 includes a fastening member 67, such as a hook, configured for attachment to another fixed structure, such as a plate or bracket. Alternatively, the strap 66 may have fastening members at each end. Attachment structures for strap 66 are illustrated on track portion 32. However, it is to be understood that attachment structures for strap 66 may alternatively or additionally be provided on middle portion 20 or track portion 30. The strap 66 may include a retraction mechanism 68—such as a spring loaded reel or a ratcheting reel—that can automatically retract strap 66 into mechanism 68. Alternatively, the strap 66 may include a buckle through which the length of the strap 66 is adjusted. The strap 66 is utilized to retain the ramp 10 in a fixed location, to reduce the chance of the ramp 10 getting kicked out from, or dislodging from, the tailgate or bed of transport vehicle 19 as a vehicular machine 18 is moved over the ramp 10. Additionally, the same or a second strap (not shown) may be utilized to retain the ramp 10 in a desired location, such as when in transit.

Figure 11:
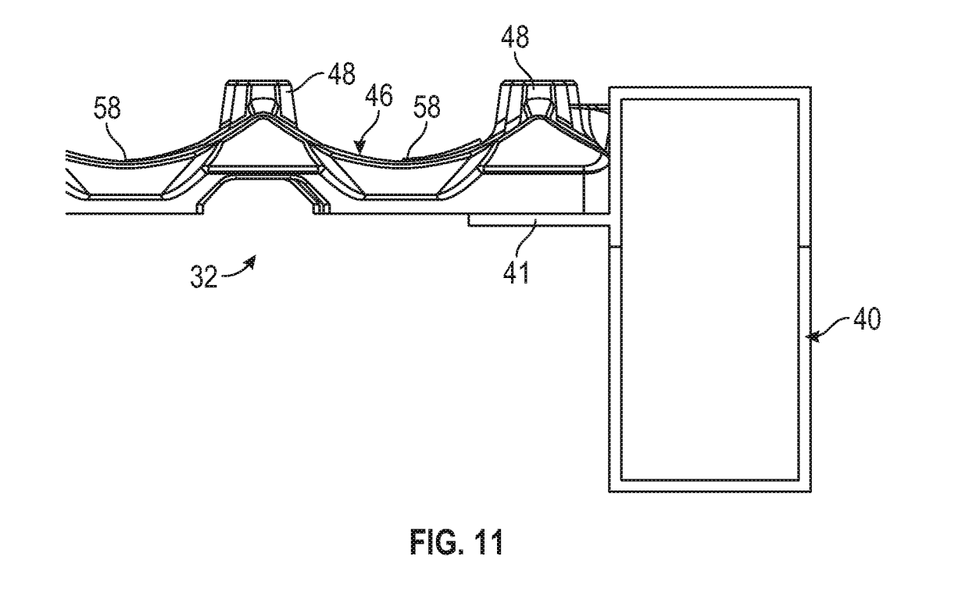
FIG. 11 is a cross sectional view of a rail of the ramp.
Figure 12:
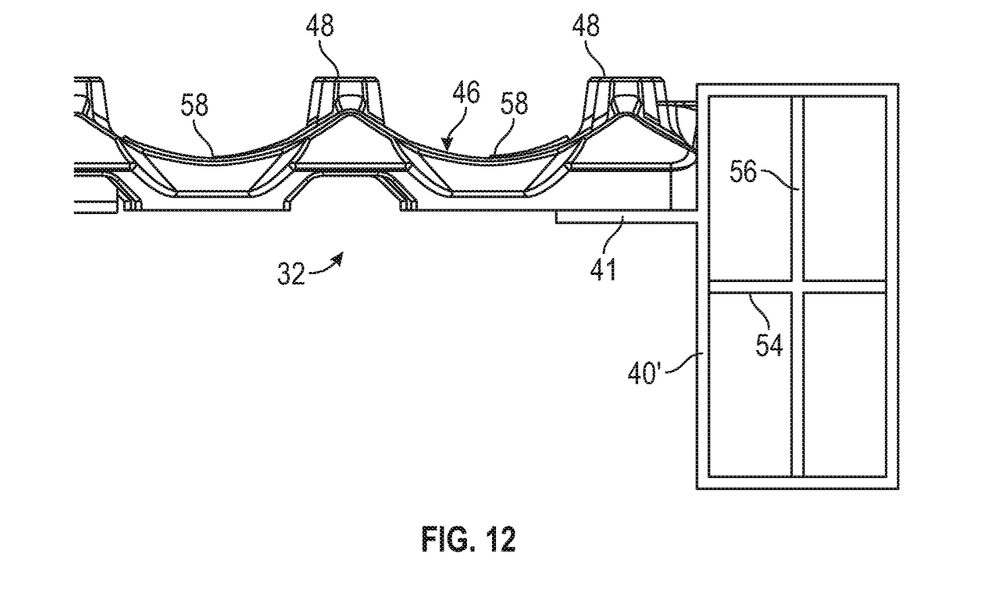
FIG. 12 is a cross sectional view of another embodiment of a rail of the ramp.

FIGS. 11 and 12 are exemplary alternative, cross-sectional configurations for a rail 40. FIGS. 11 and 12 are taken as cross-sections of a right-most portion of FIG. 4. It is to be understood that rails 22, 24, and 42 may be similarly constructed. In some embodiments where the ramp 10 is configured to be used with lighter weight vehicular machines 18, a rail 40 as illustrated in FIG. 11 can be utilized. However, when the ramp 10 is configured for use with heavier vehicular machines 18, the rail 40' can be reinforced with internal ribs 54 and 56. In one embodiment, the internal ribs 54 and 56 intersect and join all interior sides of the rail 40'.

Figure 13:
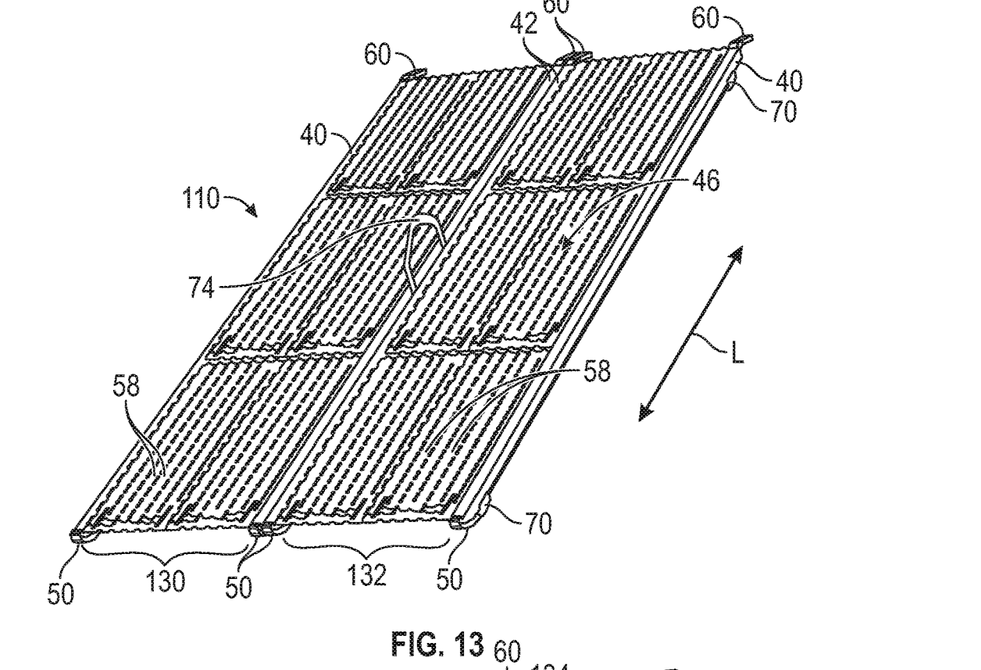
FIG. 13 is a top perspective view of another embodiment of a ramp.
Figure 14:
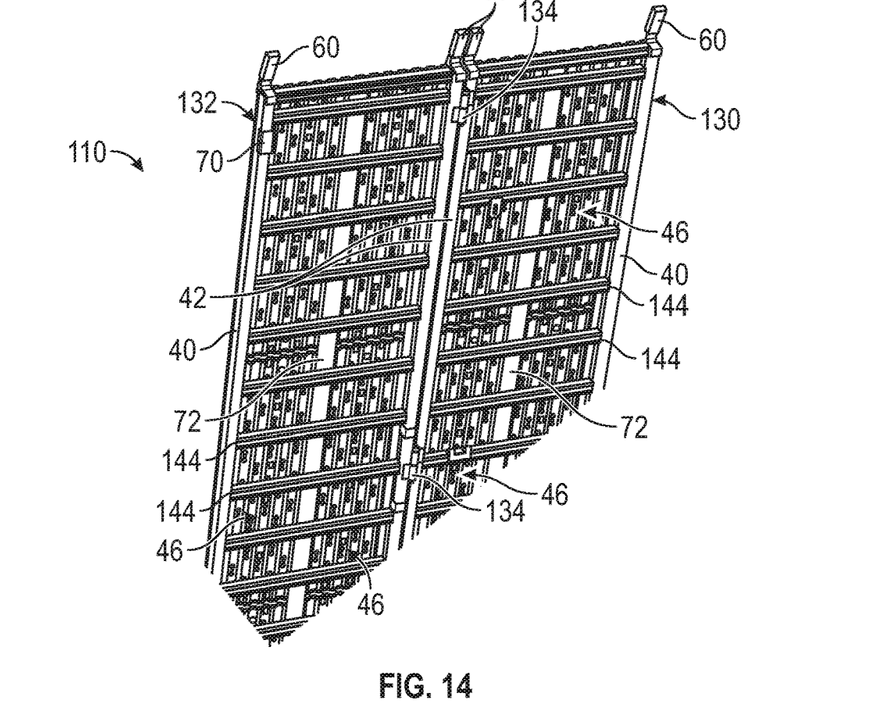
FIG. 14 is a partial underside perspective view of the ramp of FIG. 13.

Referring to FIGS. 13 and 14, another exemplary embodiment of a ramp 110 is illustrated. The ramp 110 includes a left portion 130 and a right portion 132 that are hingedly connected with a plurality of hinges 134. The ramp 110 is similar to ramp 10 in that the same or similar rails 40, 42, flexible feet 50 and bed or tailgate engaging members 60 are utilized. The ramps 110 and 10 differ in that the ramp 110 does not include a middle portion 20. In an exemplary embodiment, side portions 130 and 132 are sufficiently wide to allow a person to walk alongside a vehicular machine 18 up and down the ramp 110. In contrast, ramp 10 generally has a width adequate to accommodate a vehicular machine 18 being driven up and down the ramp 10. Moreover, because ramp 110 does not have a generally open middle portion 20, ramp 110 is easy to use, as the vehicular machine does need not be aligned on particular tracks of web 46. Additionally, having the increased width with no open middle section allows for increased flexibility in use and safety, relative to conventional ramps.

The left and right portions 130 and 132 have a similar construction to that of the left and right track portions 30 and 32. However, a width of the left and right portions 130 and 132 is significantly greater than that of the left and right track portions 30 and 32. The left and right portions 130 and 132 are mirror images of each other, and each portion 130 and 132 includes spaced apart rails 40 and 42. The left and right portions 130 and 132 include a plurality of cross members 144 that connect the spaced apart rails 40 and 42. Due to the distance between the spaced apart rails 40, 42, the portions 130 and 132 include a middle brace member 72 that is connected to each of the cross members 144, where in the middle brace member 72 enhances the structural integrity to the portions 130, 132. The middle brace member 72 also provides a surface to support portions of a web 46, especially when the web 46 comprises two or more pieces for each portion 130, 132.

Figure 19:
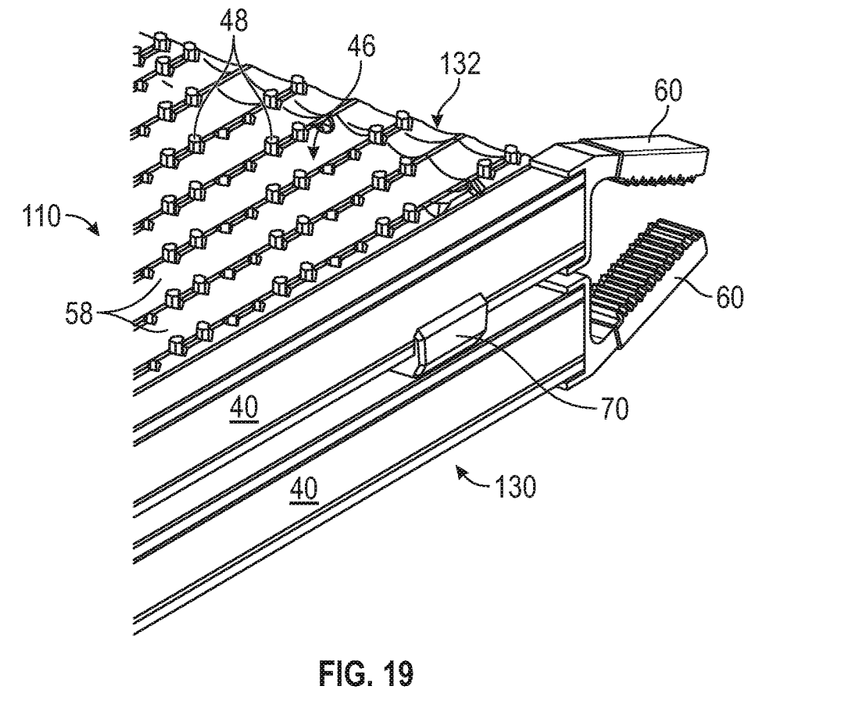
FIG. 19 is a partial perspective view of an offset slider and spacer that prevents pinching.

As shown in FIG. 13, ramp 110 includes a lifting loop 74 extending upward between left and right portions 130 and 132. Loop 74 is attached to at least one of left and right portions 130 and 132. By pulling up upon loop 74, a user can fold ramp 110 in half along hinges 134, obtaining the folded configuration shown in FIGS. 15 and 19. In the folded configuration, portions 130 and 132 are positioned adjacent each other. In this configuration, the ramp 110 can be placed in between loaded vehicular machines 18 on a transport vehicle 19. As shown in FIG. 13, loop 74 can also be used as a handle that aids in positioning and moving the ramp 110. Referring to FIG. 19, sliders 70 are useful in the folded configuration of ramp 110 for creating a gap between the adjacently positioned portions 130, 132 to prevent pinching of a user's hands or fingers therebetween.

It can be seen that ramp 110 folds differently than ramp 10. For ramp 110, in the open position of FIG. 13, top surfaces of left portion 130 and right portion 132 lie in substantially a common plane (e.g., a top surface of the open ramp 110 is substantially flat). In the closed position of FIG. 15, left and right portions 130 and 132 are pivoted downward about hinges 134 so that the top surfaces of left and right portions 130 and 132 face generally oppositely and away from each other.

Figure 22:
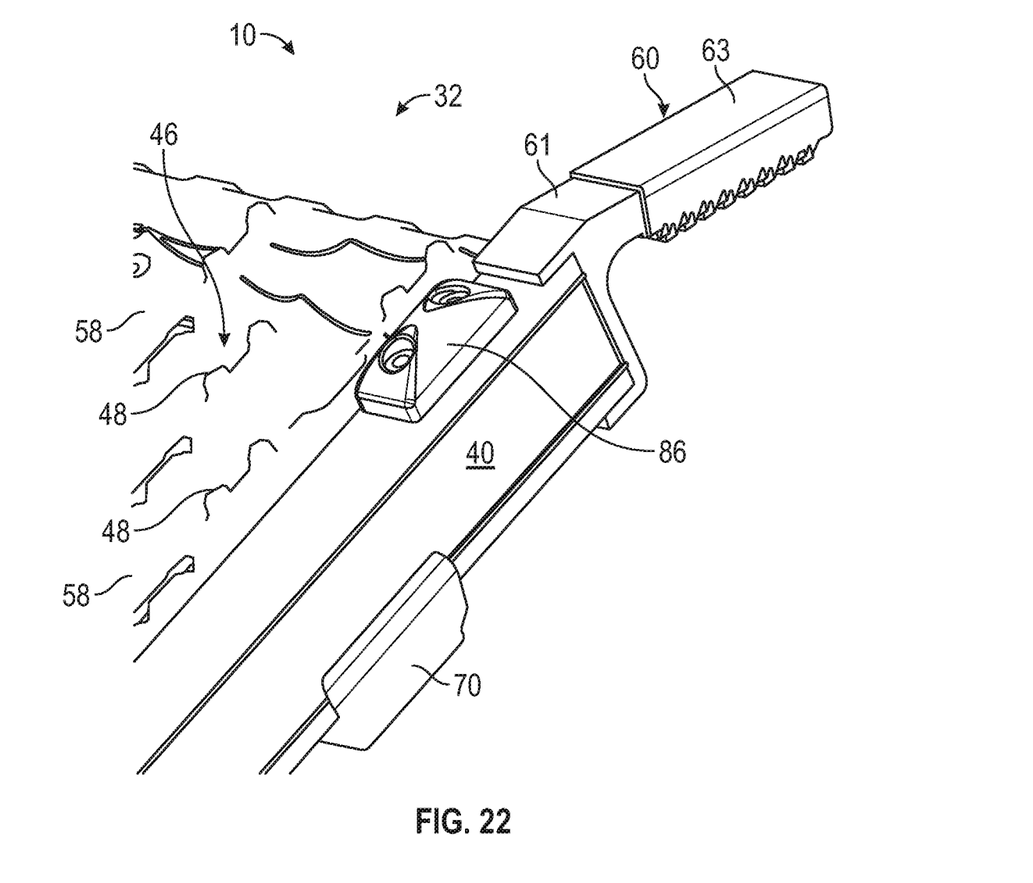
FIG. 22 is a partial perspective view of a portion of the ramp of FIG. 2, including an exemplary spacer.

FIG. 22 is a partial perspective view of a portion of the ramp 10 of FIG. 2, including an exemplary set-off or spacer 86. As shown in FIGS. 4 and 5, to obtain the folded configuration of ramp 10 in an exemplary embodiment, left and right track portions 30, 32 are pivoted upward at hinges 34, 36, respectively. In the folded configuration of FIG. 5, spacers 86 to allow a gap to remain between the rail 40 and the underlying cross bar 26, to prevent pinching of fingers. Moreover, the maintenance of such a gap prevents compression of raised members 48 of web 46 by cross bars 26 of middle portion 20. Such spacers 86 may be positioned on rails 22, 24, 40 and/or 42 at desired locations. In an exemplary embodiment, spacer 86 is formed of rubber, polymer, or a similar flexible, durable material. Spacer 86 may be attached to rails 22, 24, 40, 42 by any known fastener, such as a magnet or mechanical fastener.

Figure 16:
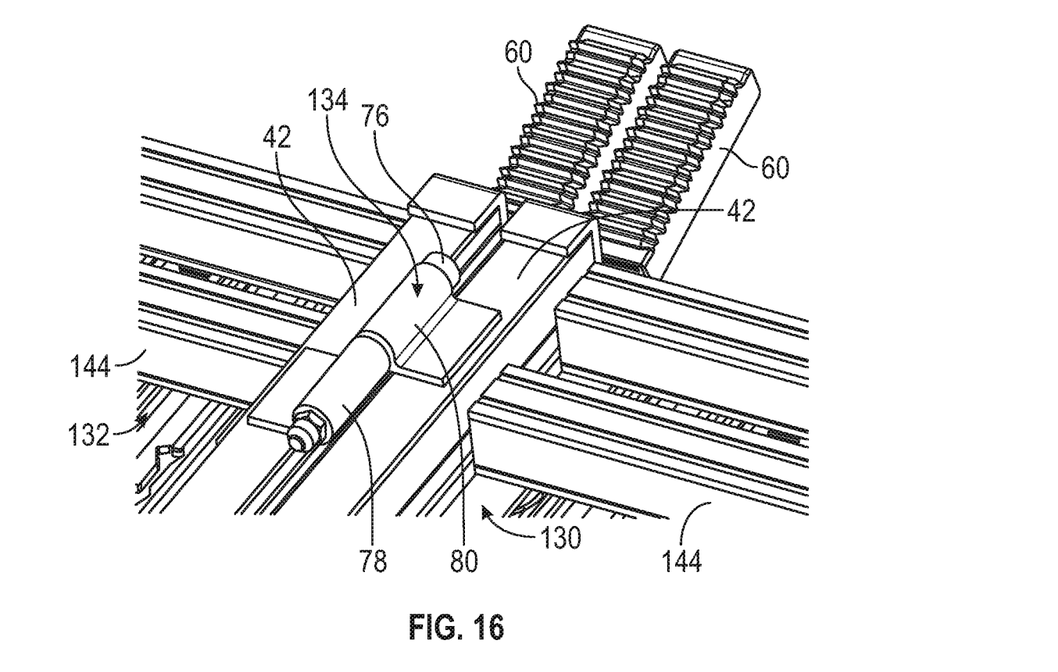
FIG. 16 is a partial perspective view of the underside of the ramp of FIGS. 13-15, showing a hinge with a removable pivot pin.
Figure 17:
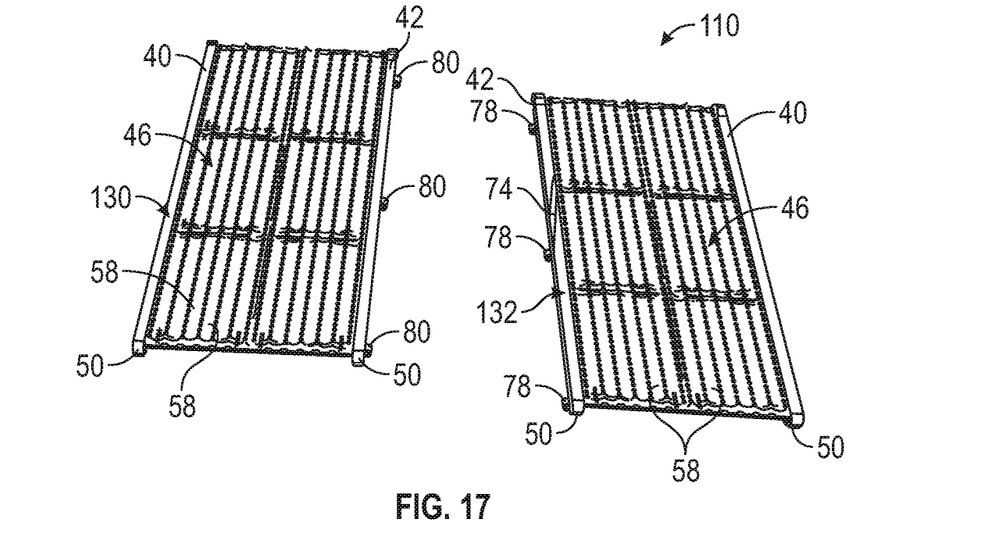
FIG. 17 is a top view of the portions of the ramp of FIGS. 13-16 in a separated configuration.

Referring to FIGS. 16 and 17, in an exemplary embodiment, the hinges 134 can be separated by removing a removable pivot pin 76 from the two barrels 78, 80 of hinge 134. Accordingly, left portion 130 can be completely separated from right portion 132, as shown in FIG. 17. As illustrated in FIG. 16, the pivot pin 76 is a threaded bolt with a nut. However, other pivot pins are also contemplated.

Referring to FIG. 17, when the barrels 78, 80 of hinge 134 are separated, the two portions 130 and 132 can be independently manipulated. In some instances where a narrower ramp is required, only one portion 130 or 132 is utilized. However, it is also contemplated that the portions 130 and 132 can be utilized separated from each other. In some instances, a different spacing of the portions 130 and 132 than shown in FIG. 13 is desirable to accommodate the spacing of wheels on a vehicular machine 18, for example. It is noted that each portion 130, 132 may include a strap 66 as discussed with respect to the ramp 10 to secure one or both portions 130 and 132 to the transport vehicle 19 or another structure. As described, it can be seen that ramps 10, 110 are universal in their ability to accommodate vehicular machines of many sizes and stances.

Figure 18:
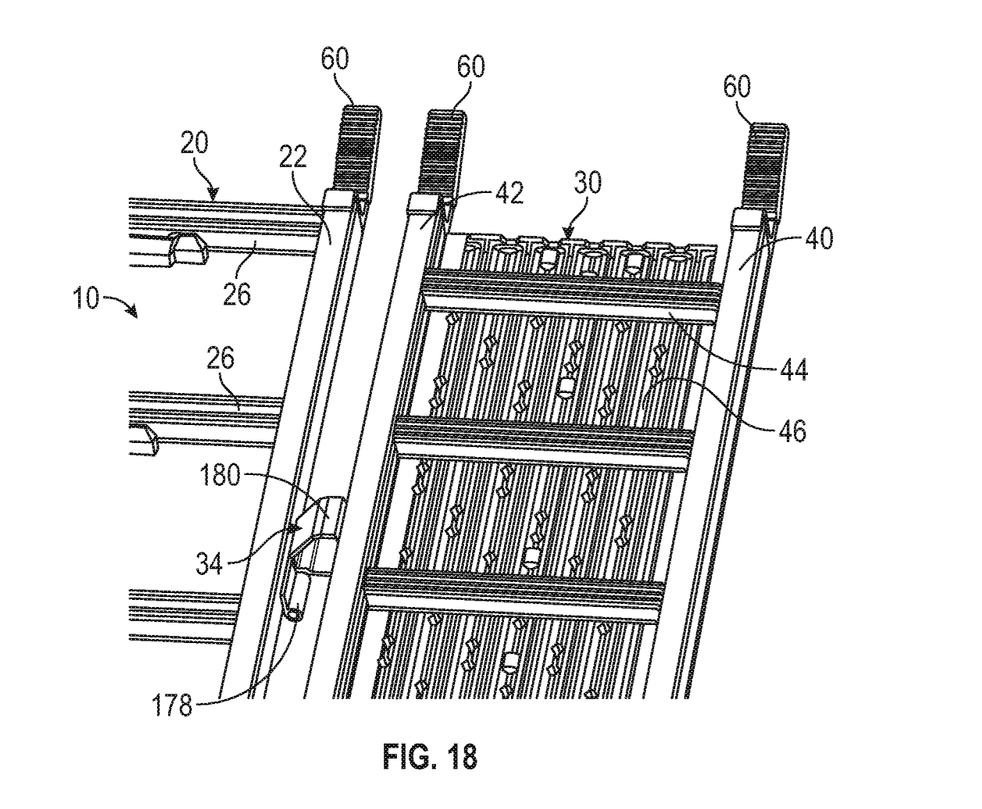
FIG. 18 is a partial perspective view of another embodiment of a hinge for the ramp of FIGS. 1-12.

Referring to FIG. 18, in some embodiments, ramp 10 includes a separating hinge 34, 36 that is similar in operation to hinge 134 described above. One portion 180 of the hinge 34 is secured to a side surface of a rail 42, and another portion 178 of the hinge 34 is secured to the side rail 22.

Figure 20:
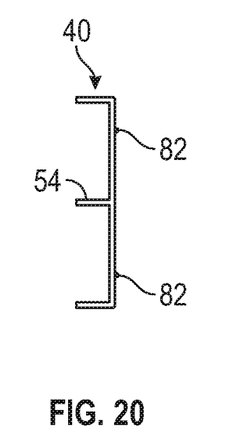
FIG. 20 is a partial cross-sectional view of a ramp side rail with external raised ribs.
Figure 21:
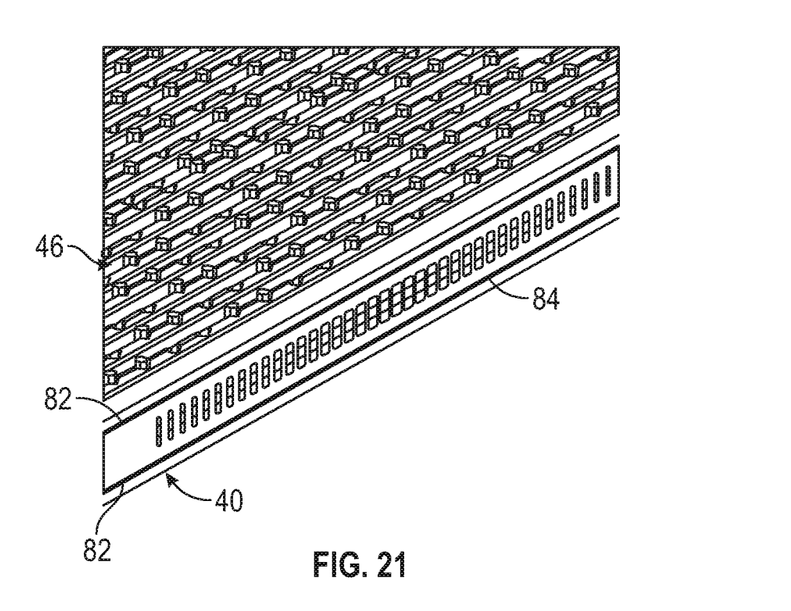
FIG. 21 is a partial perspective view of the side rail of FIG. 20 with indicia provided between the raised ribs.

Referring to FIGS. 20 and 21, the visible outer sides of the rails 40 of the ramps 10 and 110 may include raised ribs 82 that are spaced apart. The raised ribs 82 are optional and are configured to protect a decorative decal 84 or other indicia placed between ribs 82 on the side surfaces of the rails 40.

Figure 15:
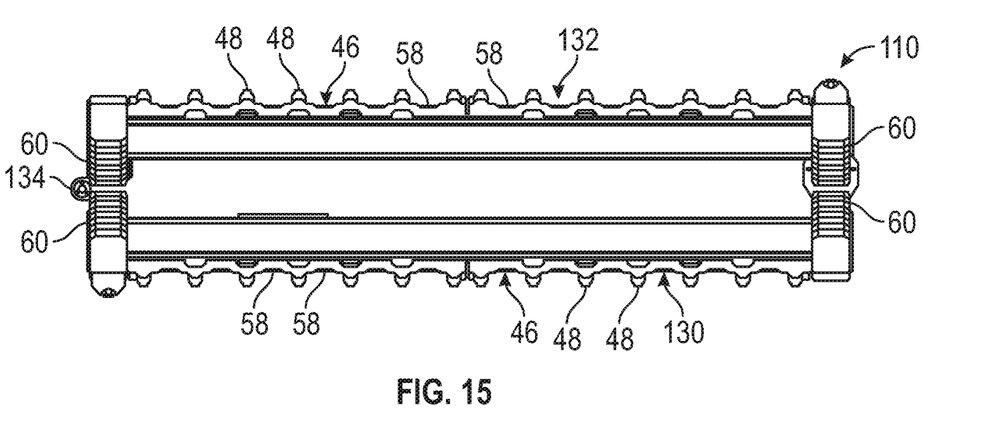
FIG. 15 is a front view illustrating the ramp of FIGS. 13 and 14 in a folded configuration.

In the folded configuration of ramp 10 shown in FIG. 5 or the folded configuration of ramp 110 shown in FIGS. 15 and 19, the left and right portions 30, 130 and 32, 132 may be mechanically locked in place by a pin, for example. Alternatively, the portions 30, 130 and 32, 132 can be secured together with other mechanical couplings. Moreover, in the open, flat configurations of ramp 10 shown in FIGS. 1-4, and ramp 110 shown in FIGS. 13 and 14, the sections 20, 30, 32 or 130, 132 can be pinned or otherwise locked together to stable hold the desired configuration.

In an exemplary embodiment, ramp 10, 100 has a length along longitudinal dimension L of about 7.5 feet (90 inches). This length allows for a safe loading angle between end 16 on the ground surface and end 14 on the transport vehicle 19. An exemplary width of the unfolded ramp 10 of FIG. 4 is about 52 inches. An exemplary width of the folded ramp 10 of FIG. 5 is about 27 inches. An exemplary folded ramp 10 weighs about 44 pounds and has an exemplary load capacity rating of about 1500 pounds. It is to be understood that other dimensions are also suitable.

In some embodiments the bed of the trailer of the transport vehicle 19 can be equipped with a bridge tailgate standoff. The bridge tailgate standoff lifts the vehicular machine 18 above the bed to provide sufficient space to position the folded ramp 10, 110 under the vehicular machine 18 during transit.

Although the present disclosure has been described with reference to preferred embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. A ramp configured for moving a snowmobile or a wheeled all-terrain vehicle from a lower surface to a bed of a vehicle or trailer, the ramp having a length in a direction of travel, the ramp comprising:
    a middle portion configured to be engaged by a track of a snowmobile as the snowmobile moves in the direction of travel, the middle portion comprising:
        first and second spaced apart rails oriented substantially in the direction of travel;
        a plurality of spaced apart cross bars connecting the spaced apart rails, wherein the plurality of spaced apart cross bars being oriented substantially perpendicular to the spaced apart rails; and
        a plurality of traction enhancing covers located on at least a portion of at least one of the plurality of cross bars;
    first and second outer portions configured to engage skis of the snowmobile or tires of the wheeled all-terrain vehicle, the first portion hingedly attached to the first spaced apart rail of the middle portion with spaced apart first hinges and the second portion hingedly attached to the second spaced apart rail of the middle portion with spaced apart second hinges, each of the first and second outer portions comprising:

third and fourth spaced apart rails oriented substantially in the direction of travel; and a web positioned between the third and fourth spaced apart rails, the web having a plurality of channels in the direction of travel, the channels configured to assist in directing skis of the snowmobile up the ramp along the direction of travel and the web being configured to provides support for the tires of the wheeled all-terrain vehicle;

wherein the first and second outer portions are configured to be positioned into a first position wherein upper surfaces of the third and fourth spaced apart rails are substantially planar with upper surfaces of the first and second rails and wherein the first and second spaced apart hinges engage the first and second spaced apart rails of the middle portion to prevent the first and second outer portions from further downward rotation relative to the middle portion and a second position where the first and second outer portions are rotated about the hinges to stack the first and second outer portions such that the ramp is positioned in two substantially parallel layers.

2. The ramp of claim 1, wherein the first outer portion, the second outer portion and the middle portion each comprise spaced apart bed or tailgate engaging mechanism extending from a first end of the ramp, each spaced apart bed or tailgate engaging mechanism configured to engage the bed or a tailgate of the vehicle or the trailer when the ramp is in the first position.

3. The ramp of claim 2, wherein each of the spaced apart bed or tailgate engaging mechanisms comprises:

a rigid portion extend from the first end of the ramp; and a flexible overlay over the rigid portion configured to grip the bed or the tailgate of the vehicle or trailer.

4. The ramp of claim 3, wherein the flexible overly comprises an uneven surface configured to engage the bed or the tailgate of the vehicle or trailer.

5. The ramp of claim 1, where the web comprises a plurality of raised members arranged so that the channels along the direction of travel are defined between at least some of the first plurality of raised members.

6. The ramp of claim 1, and further comprising:

a strap configured to be secured to the ramp and to the vehicle or trailer wherein the strap is configured to retain the ramp to the bed or the tailgate of the vehicle or trailer as the snowmobile or the wheel vehicle moves in the direction of travel.

* * * * *